United States Patent
Yang et al.

(10) Patent No.: US 12,124,928 B2
(45) Date of Patent: Oct. 22, 2024

(54) MACHINE MODEL UPDATE METHOD AND APPARATUS, MEDIUM, AND DEVICE

(71) Applicant: Shenzhen Horizon Robotics Technology Co., Ltd., Shenzhen (CN)

(72) Inventors: Cong Yang, Shenzhen (CN); Yunhui Zhang, Shenzhen (CN); Zhikai Zhang, Shenzhen (CN)

(73) Assignee: Shenzhen Horizon Robotics Technology Co., Ltd., Shenzhen (CN)

( * ) Notice: Subject to any disclaimer, the term of this patent is extended or adjusted under 35 U.S.C. 154(b) by 409 days.

(21) Appl. No.: 17/543,706

(22) Filed: Dec. 6, 2021

(65) Prior Publication Data

US 2022/0198331 A1 Jun. 23, 2022

(30) Foreign Application Priority Data

Dec. 18, 2020 (CN) .......................... 202011502264.9

(51) Int. Cl.
*G06N 20/00* (2019.01)
*G06V 10/764* (2022.01)
(Continued)

(52) U.S. Cl.
CPC .......... *G06N 20/00* (2019.01); *G06V 10/764* (2022.01); *G06V 10/774* (2022.01);
(Continued)

(58) Field of Classification Search
CPC .. G06V 10/774; G06V 10/764; G06V 10/776; G06V 10/82; G06V 20/597; G06N 20/00
See application file for complete search history.

(56) References Cited

U.S. PATENT DOCUMENTS

2020/0151613 A1* 5/2020 Yoo ...................... G06F 11/3466
2020/0342267 A1* 10/2020 Usuda .................... G06V 10/82

FOREIGN PATENT DOCUMENTS

CN 106372658 A 2/2017
CN 108647577 A 10/2018
(Continued)

OTHER PUBLICATIONS

Chinese Office Action regarding Application No. 202011502264.9, dated Nov. 30, 2023.
(Continued)

*Primary Examiner* — Vu Le
*Assistant Examiner* — Tracy Mangialaschi
(74) *Attorney, Agent, or Firm* — Harness, Dickey & Pierce, P.L.C.

(57) ABSTRACT

Disclosed are a machine model update method and apparatus, a medium, and a device. The method includes: obtaining first hard example samples of a machine model and attribute information of the first hard example samples; determining category-based data distribution information of the first hard example samples according to the attribute information of the first hard example samples; determining second hard example samples of the machine model in current machine learning according to learning requirement information of the machine model for categories of the first hard example samples and the data distribution information; performing, according to learning operation information corresponding to the machine model, a learning operation on the machine model by using the second hard example samples; and updating the machine model based on a learning result of the machine model. The present disclosure helps efficiently implement a machine learning lifecycle, and reduce the cost of machine learning lifecycle.

20 Claims, 4 Drawing Sheets

(51) Int. Cl.
*G06V 10/774* (2022.01)
*G06V 10/776* (2022.01)
*G06V 10/82* (2022.01)
*G06V 20/59* (2022.01)

(52) U.S. Cl.
CPC .......... *G06V 10/776* (2022.01); *G06V 20/597* (2022.01); *G06V 10/82* (2022.01)

(56) References Cited

FOREIGN PATENT DOCUMENTS

| CN | 110751225 A |   | 2/2020 |   |   |
|----|-------------|---|--------|---|---|
| CN | 111667050 A | * | 9/2020 | ........... | G06K 9/6215 |

OTHER PUBLICATIONS

Search Report of first Chinese Office Action regarding Application No. 2020115022649, dated Nov. 30, 2023.

\* cited by examiner

S500, grouping the first hard example samples of the machine model according to the category-based data distribution information of the first hard example samples, and obtaining grouping information of a plurality of hard example groups of the machine model S501, determining a hard example group of the machine model in current learning according to the learning requirement information of the machine model for the categories of the first hard example samples and the grouping information

FIG. 5

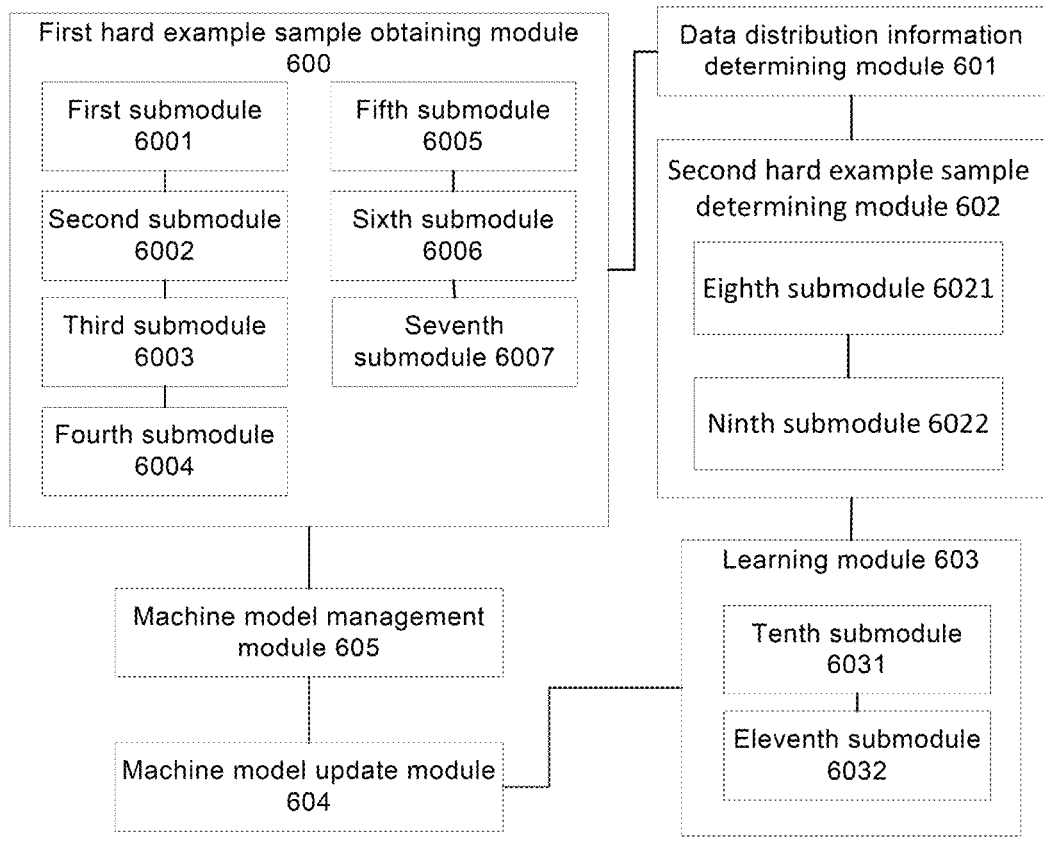

FIG. 6

MACHINE MODEL UPDATE METHOD AND APPARATUS, MEDIUM, AND DEVICE

RELATED APPLICATION INFORMATION

This application claims priority to Chinese patent application No. 202011502264.9, filed on Dec. 18, 2020, incorporated herein by reference.

TECHNICAL FIELD

The present disclosure relates to computer technologies, and in particular to a machine model update method, a machine model update apparatus, a storage medium, and an electronic device.

BACKGROUND

Machine models such as neural networks have been widely used in various applications such as customer services, driving, games, and robotics. However, the machine models usually need to be continuously improved during use, so that performance of the machine models can be continuously boosted.

How to improve performance of a machine model conveniently and at a low cost is a technical issue worthy of attention.

SUMMARY

To resolve the foregoing technical problem, the present disclosure is proposed. Embodiments of the present disclosure provide a machine model update method and apparatus, a storage medium, and an electronic device.

According to one aspect of the embodiments of the present disclosure, there is provided a machine model update method, including: obtaining first hard example samples of a machine model and attribute information of the first hard example samples; determining category-based data distribution information of the first hard example samples according to the attribute information of the first hard example samples; determining second hard example samples of the machine model in current machine learning according to learning requirement information of the machine model for categories of the first hard example samples and the data distribution information; performing, according to learning operation information corresponding to the machine model, a learning operation on the machine model by using the second hard example samples; and updating the machine model based on a learning result of the machine model.

According to another aspect of the embodiments of the present disclosure, there is provided a machine model update apparatus, including: a first hard example sample obtaining module, configured to obtain first hard example samples of a machine model and attribute information of the first hard example samples; a data distribution information determining module, configured to determine category-based data distribution information of the first hard example samples according to the attribute information of the first hard example samples obtained by the first hard example sample obtaining module; a second hard example sample determining module, configured to determine second hard example samples of the machine model in current machine learning according to learning requirement information of the machine model for categories of the first hard example samples and the data distribution information determined by the data distribution information determining module; a learning module, configured to perform, according to learning operation information corresponding to the machine model, a learning operation on the machine model by using the second hard example samples determined by the second hard example sample determining module; and a machine model update module, configured to update the machine model based on a learning result of the machine model obtained by the learning module.

According to still another aspect of the embodiments of the present disclosure, a computer readable storage medium is provided. The storage medium stores a computer program, and the computer program is configured to implement the foregoing method.

According to yet another aspect of the embodiments of the present disclosure, there is provided an electronic device, including: a processor; and a memory, configured to store processor executable instructions, wherein the processor is configured to read the executable instructions from the memory, and execute the instructions to implement the foregoing method.

Based on the method and apparatus for updating a machine model provided in the embodiments of the present disclosure, the first hard example samples of the machine model are obtained, and the data distribution information of the first hard example samples is obtained based on the attribute information of the first hard example samples, so that in each machine model update process, hard examples that meet a learning requirement of the machine model can be conveniently provided to the machine model, and the machine model can be automatically updated based on each learning result of the machine model. It can be learned from the above statement that, the technical solutions provided in the present disclosure help to connect a plurality of important stages related to a machine learning lifecycle to form a closed loop, so as to efficiently implement initialization of the machine learning lifecycle, and help to reduce the cost of the machine learning lifecycle.

The following describes the technical solutions of the present disclosure in further detail with reference to accompanying drawings and embodiments.

BRIEF DESCRIPTION OF DRAWINGS

The above and other objectives, features, and advantages of the present disclosure will become more apparent from more detailed description of the embodiments of the present disclosure with reference to accompanying drawings. The accompanying drawings are used to provide a further understanding of the embodiments of the present disclosure, and constitute a part of the specification, which are used to explain the present disclosure in combination with the embodiments of the present disclosure, and do not constitute a limitation to the present disclosure. In the accompanying drawings, the same reference numerals usually represent the same components or steps.

FIG. 5 is a flowchart of an embodiment of determining second hard example samples of a machine model in current machine learning according to the present disclosure;

FIG. 6 is a schematic structural diagram of an embodiment of a machine model update apparatus according to the present disclosure.

DETAILED DESCRIPTION OF THE EMBODIMENTS

Figure 1:
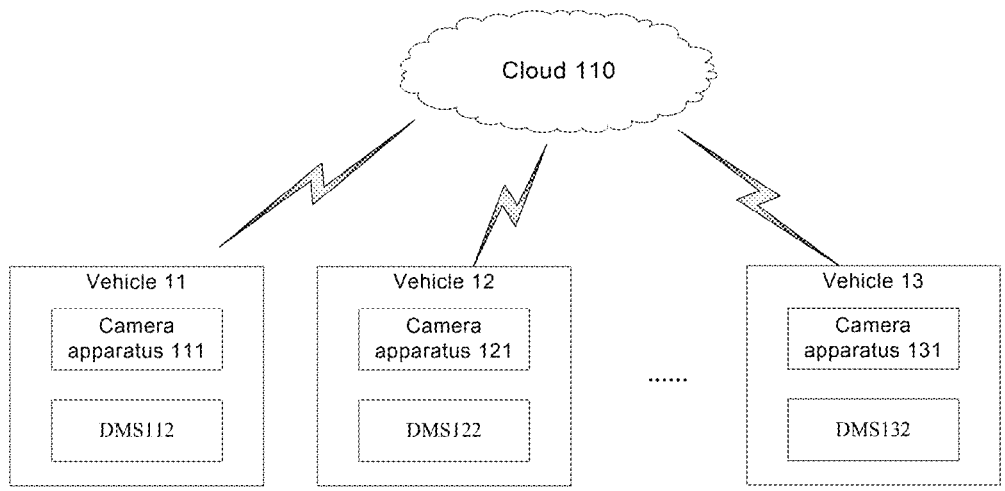
FIG. 1 is a schematic diagram of an application scenario of a machine model update technology according to the present disclosure.

Exemplary embodiments of the present disclosure are described in detail below with reference to the accompanying drawings. Apparently, the described embodiments are merely some but not all of the embodiments of the present disclosure. It should be understood that the present disclosure is not limited by the exemplary embodiments described herein.

It should be noted that unless otherwise stated specifically, the relative arrangement of components and steps, numerical expressions, and numerical values set forth in these embodiments do not limit the scope of the present disclosure.

A person skilled in the art may understand that the terms, such as "first" and "second" and the like in the embodiments of the present disclosure are merely used to discriminate different steps, devices, modules, or the like, which neither represent any specific technical meanings, nor indicate a necessary logical order between them.

It should also be understood that in the embodiments of the present disclosure, "a plurality of" may refer to two or more than two, and "at least one" may refer to one, two, or more than two.

It should also be understood that any component, data, or structure mentioned in the embodiments of the present disclosure can generally be understood as one or more unless opposite enlightenment is clearly defined or given in the context.

In addition, the term "and/or" in the present disclosure describes only an association relationship for describing associated objects and represents that three relationships may exist. For example, A and/or B may represent the following three cases: only A exists, both A and B exist, and only B exists. In addition, the character "/" in the present disclosure generally indicates an "or" relationship between the associated objects.

It should also be understood that the description of each embodiment in the present disclosure focuses on differences between embodiments, and for the same or similar parts between the embodiments, reference may be mutually made to the embodiments. For brevity, details are not described again.

In addition, it should be understood that parts in the accompanying drawings are merely shown for ease of description, and are not necessarily drawn to scale.

The following description of at least one exemplary embodiment is actually only illustrative, and in no way serves as any limitation to the present disclosure and its application or use.

Technologies, methods, and devices known to persons of ordinary skill in the related art may not be discussed in detail, but where appropriate, the technologies, methods, and devices should be regarded as part of the specification.

It should be noted that similar reference numerals and letters in the following accompanying drawings represent similar items. Therefore, once an item is defined in an accompanying drawing, the item does not need to be further interpreted in subsequent accompanying drawings.

The embodiments of the present disclosure can be applied to an electronic device such as a terminal device, a computer system, or a server, which can operate with many other general-purpose or special-purpose computing systems, environments, or configurations. Examples of well-known terminal devices and computing systems, environments, and/or configurations suitable for use with the electronic device such as a terminal device, a computer system, or a server include, but are not limited to, personal computer systems, server computer systems, thin clients, thick clients, handheld or laptop devices, microprocessor-based systems, set-top boxes, programmable consumer electronics, networked personal computers, small computer systems, large computer systems, distributed cloud computing technology environments including any one of the systems, or the like.

The electronic device such as a terminal device, a computer system, or a server can be described in the general context of computer system executable instructions (such as program modules) executed by the computer system. Generally, the program modules may include routines, programs, object programs, components, logic, data structures, or the like, which perform specific tasks or implement specific abstract data types. The computer system/server can be implemented in a distributed cloud computing environment. In the distributed cloud computing environment, tasks can be performed by a remote processing device linked through a communication network. In the distributed cloud computing environment, the program modules may be located on a storage medium of a local or remote computing system including a storage device.

Overview of the Present Disclosure

In a process of implementing the present disclosure, it is found that a machine learning lifecycle generally refers to a process in which a machine model such as a neural network is continuously iterated and updated to meet a system requirement on the machine model. The machine learning lifecycle may be considered as an iteration and update process of the machine model.

The machine learning lifecycle is usually closely related to many factors such as data from a real scene and feedback during the use of the machine model. As a result, the machine learning lifecycle involves a lot of stages.

Existing tools for implementing the machine learning lifecycle are usually very complex, and can be operated and used only by personnel with considerable professional technical knowledge. If a closed loop that can be automatically executed can be formed in some stage of the machine learning lifecycle, it will facilitate efficient implementation of the machine learning lifecycle and reduce the implementation cost of the machine learning lifecycle.

Exemplary Overview

The technical solutions for updating a machine model according to the present disclosure are applicable to various scenarios. For example, the technical solutions for updating a machine model according to the present disclosure are applicable to a driver monitoring system (DMS) application scenario.

An application scenario of a machine model update technology according to the present disclosure is described below with reference to FIG. 1.

In FIG. 1, a camera apparatus and a DMS are respectively configured in each of vehicles (FIG. 1 shows only three vehicles 11, 12, and 13 for example). For example, a camera apparatus 111 and a DMS112 are configured in the vehicle 11; a camera apparatus 121 and a DMS122 are configured in the vehicle 12; and a camera apparatus 131 and a DMS132 are configured in the vehicle 13. For any vehicle (such as the vehicle 11), the obtained video frames collected by a camera apparatus (such as the camera apparatus 111) in the vehicle in real time are all provided to a DMS (such as the DMS112) in the vehicle.

The DMS (such as the DMS112) in the vehicle may determine, by using a corresponding machine model, whether the driver is currently in a fatigue driving state according to the video frames received by the DMS. If a determining result of the DMS (such as the DMS112) is that the driver is currently in a fatigue driving state (such as a severe fatigue state, a moderate fatigue state, or a mild fatigue state), the DMS (such as the DMS112) may perform operations such as opening a window, playing music, playing a warning voice, and turning on a warning light, to ensure safe driving of the vehicle (such as the vehicle 11). If the determining result of the DMS (such as the DMS112) is that the driver is currently in a suspected fatigue state (such as a suspected severe fatigue state, a suspected moderate fatigue state, or a suspected mild fatigue state), the DMS (such as the DMS112) may upload corresponding video frames (such as all video frames in a time window) or image block sequences (such as eye region image block sequences and mouth region image block sequences in all video frames in a time window) as hard examples (badcases) to a cloud 110.

The cloud 110 may collect hard examples reported respectively by the DMSs (such as the DMS112, the DMS122, and the DMS132) in the vehicles (such as the vehicle 11, the vehicle 12, and the vehicle 13), and perform a learning operation on a corresponding machine model based on the plurality of hard examples collected by the cloud. After the machine model learns successfully, the cloud 110 may use the successfully learned machine model to update machine models respectively used by the DMSs (such as the DMS112, the DMS122, and the DMS132) in the vehicles (such as the vehicle 11, the vehicle 12, and the vehicle 13). Then, the DMS in each vehicle can use an updated machine model, to continue to determine whether the driver is currently in a fatigue driving state.

Because the process of updating the machine model may form a closed loop, the present disclosure may allow the machine model used by the DMS in each vehicle to be continuously improved, so that the performance of the machine model used by the DMS can be continuously improved.

Exemplary Method

Figure 2:
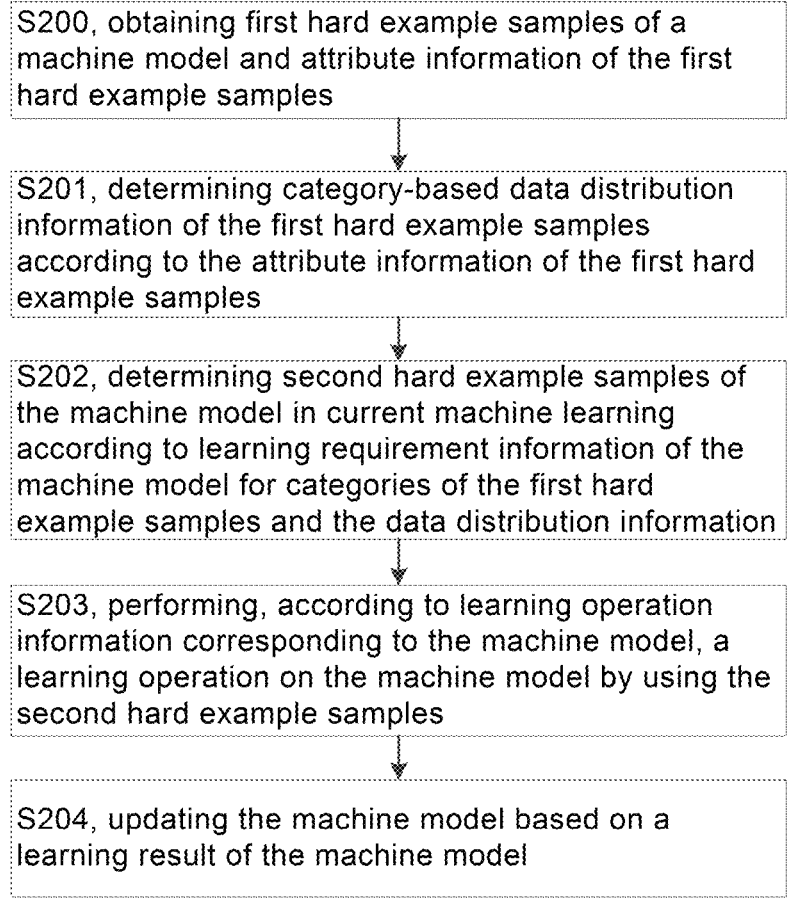
FIG. 2 is a flowchart of an embodiment of a machine model update method according to the present disclosure.

FIG. 2 is a flowchart of an embodiment of a machine model update method according to the present disclosure. As shown in FIG. 2, the method mainly includes step S200, step S201, step S202, step S203, and step S204. The steps are separately described below.

Step S200, obtaining first hard example samples of a machine model and attribute information of the first hard example samples.

In the present disclosure, the machine model may be a model such as a neural network for implementing artificial intelligence. The first hard example sample may be a sample that is easy to be incorrectly recognized by the machine model, that is, a badcase. The first hard example sample may be an image-based sample (such as a sample in a JPG format or a sample in a PNG format), an audio-based sample (such as a sample in an AVI format or a sample in an MP4 format), or a text-based sample.

The attribute information of the first hard example sample may include attribute units that describe the first hard example sample from multiple aspects. The first hard example samples and the attribute information of the first hard example samples may be obtained by receiving reported information or other means.

Step S201, determining category-based data distribution information of the first hard example samples according to the attribute information of the first hard example samples.

In the present disclosure, the first hard example samples may be classified into different categories based on category-related information in the attribute information of the first hard example samples, and thus the category-based data distribution information of the first hard example samples can be obtained.

Step S202, determining second hard example samples of the machine model in current machine learning according to learning requirement information of the machine model for categories of the first hard example samples and the data distribution information.

In the present disclosure, the learning requirement information of the machine model for the categories of the first hard example samples may include a quantity ratio requirement of the machine model on different categories of first hard example samples. Some of the first hard example samples may be selected based on the learning requirement information of the machine model for the categories of the first hard example samples and the data distribution information, as second hard example samples of the machine model in the current machine learning.

Step S203, performing, according to learning operation information corresponding to the machine model, a learning operation on the machine model by using the second hard example samples.

In the present disclosure, the learning operation information corresponding to the machine model may be a program that enables to perform machine learning of the machine model, or the like. The learning operation information corresponding to the machine model may be run to perform corresponding operation processing on the second hard example samples by using the machine model. Network parameters of the machine model may be updated based on operation processing results and attribute information of the second hard example samples, so that the machine model has a new set of network parameters.

Step S204, updating the machine model based on a learning result of the machine model.

In the present disclosure, the learning result of the machine model includes a machine model learning success or a machine model learning failure. In a case of the machine model learning success, a new version of the machine model is obtained, and the new version of the machine model may be delivered to update a machine model. For example, machine models in a plurality of clients may be updated by downloading related information of the new version of the machine model in an Over-the-Air (OTA) manner.

In the present disclosure, the first hard example samples of the machine model are obtained, and the data distribution information of the first hard example samples is obtained based on the attribute information of the first hard example samples, so that in each machine model update process, hard examples that meet a learning requirement of the machine model can be conveniently provided to the machine model, and the machine model can be automatically updated based on each learning result of the machine model. It can be learned from above that, the technical solutions provided in the present disclosure help to connect a plurality of important stages related to a machine learning lifecycle to form a closed loop, so as to efficiently implement initialization of the machine learning lifecycle, and help to reduce the cost of the machine learning lifecycle. The initialization of the machine learning lifecycle in the present disclosure may be considered as an initial stage of the machine learning lifecycle.

Figure 3:
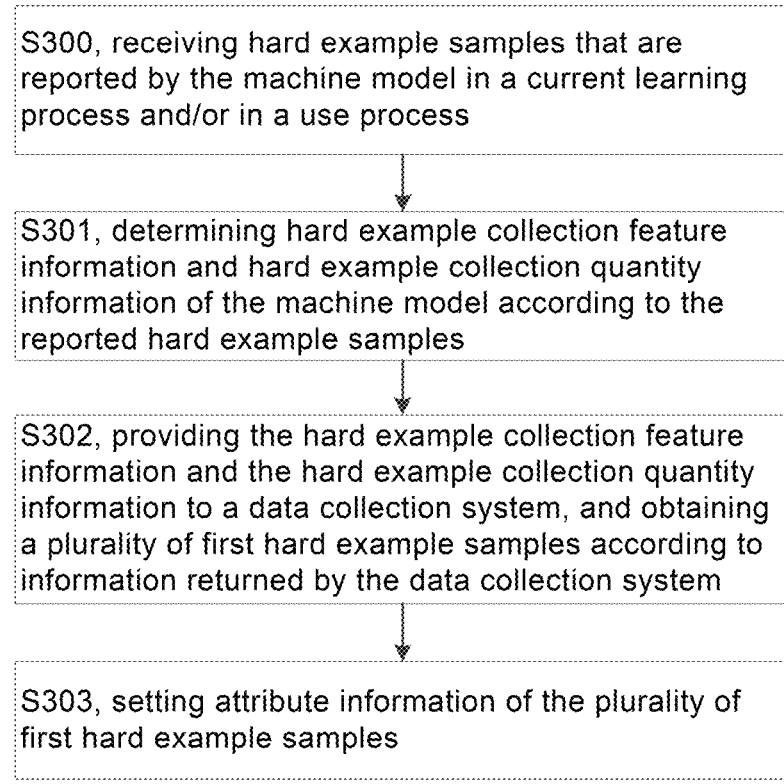
FIG. 3 is a flowchart of an embodiment of obtaining first hard example samples of a machine model and attribute information of the first hard example samples in a sample collection manner according to the present disclosure.

In an optional example, the first hard example samples of the machine model and the attribute information of the first hard example samples may be obtained in a sample collection manner, as shown in FIG. 3.

S300, receiving hard example samples that are reported by the machine model in a current learning process and/or in a use process.

Optionally, in the present disclosure, the machine model performs corresponding operation processing on a first hard example sample for learning in a learning process of the machine model. It may be determined, by using annotation information of the first hard example sample for learning, whether a result of the operation processing performed by the machine model on the first hard example sample for learning is correct. If the result of the operation processing is incorrect, the first hard example sample may be reported as a hard example sample, or otherwise, the first hard example sample is not reported as a hard example sample.

Optionally, in the present disclosure, a historical machine model that previously learned successfully is delivered and applied in an actual environment. For example, the machine model is currently used by a plurality of vehicles. For another example, the machine model is currently used by a plurality of mobile phones. For yet another example, the machine model is currently used by security systems of various organizations. The machine model applied in the actual environment performs corresponding operation processing on to-be-processed information (such as a to-be-processed video frame, a to-be-processed image block, a to-be-processed text, or a to-be-processed voice) generated in the actual environment. To-be-processed information that needs to be reported (for example, to the cloud) may be determined by setting a corresponding threshold or other means, and to-be-processed information reported from the actual environment is used as hard example samples.

S301, determining hard example collection feature information and hard example collection quantity information of the machine model according to the reported hard example samples.

Optionally, in the present disclosure, the plurality of collected hard example samples may be classified based on feature categories, so that respective feature information of the plurality of collected hard example samples may be obtained, and a quantity of hard example samples having a respective feature may be obtained. For example, a neural network for classification may be used to perform classification operation processing on the plurality of collected hard example samples, and respective feature information of each hard example sample is obtained according to a result of the classification operation processing. A quantity of hard example samples having the same feature information is counted, so that the quantity of hard example samples having a respective feature may be obtained.

Optionally, the hard example collection feature information of the machine model may be determined according to feature information of the plurality of hard example samples. For example, if the feature information of the plurality of hard example samples includes feature information of the mouth being blocked by a hand, the feature information of the mouth being blocked by a hand is used as hard example collection feature information. For another example, if the feature information of the plurality of hard example samples includes feature information of the target object wearing a hat, the feature information of the target object wearing a hat is used as hard example collection feature information.

Optionally, the hard example collection quantity information may include a collection ratio of first hard example samples having different features. For example, if the reported hard example samples have n (n is an integer larger than or equal to 1) features, a quantity of hard example samples having a respective feature may be calculated to obtain n quantities. A ratio formed by the n quantities (such as $n_1:n_2: \ldots :n_n$, where $n_1$ represents a value corresponding to a quantity of hard example samples having a first feature, $n_2$ represents a value corresponding to a quantity of hard example samples having a second feature, . . . , and $n_n$ represents a value corresponding to a quantity of hard example samples having an $n^{th}$ feature) may be used as a collection ratio of first hard example samples having different features.

Optionally, the hard example collection quantity information may alternatively include collection quantities of first hard example samples having different features. For example, if the reported hard example samples have n (n is an integer larger than or equal to 1) features, a quantity of hard example samples having a respective feature may be first calculated to obtain n quantities. Thus, a ratio formed by the n quantities (such as $n_1:n_2: \ldots :n_n$) can be obtained. Then, the collection quantities of first hard example samples having different features may be obtained according to a total quantity of first hard example samples required for machine model learning and the ratio (such as $n_{11}$, $n_{22}$, . . . , $n_{nn}$, where $n_{11}$ represents a collection quantity of first hard example samples having a first feature, $n_{22}$ represents a collection quantity of first hard example samples having a second feature, . . . , and $n_{nn}$ represents a collection quantity of first hard example samples having an $n^{th}$ feature).

S302, providing the hard example collection feature information and the hard example collection quantity information to a data collection system, and obtaining a plurality of first hard example samples according to information returned by the data collection system.

Optionally, in the present disclosure, the data collection system may be a system that can collect the first hard example samples according to the received hard example collection feature information and hard example collection quantity information. For example, the data collection system may include a camera apparatus, an image recognition apparatus, or an image block cutting apparatus. For another example, the data collection system may include a recording apparatus, a voice recognition apparatus, or a voice clipping apparatus. A specific structure of the data collection system and a specific process of collecting the first hard example samples are not limited in the present disclosure.

Optionally, a hard example collection task may be generated for the hard example collection feature information and the hard example collection quantity information, and submitted to the data collection system. One hard example collection task usually has a unique identifier for the hard example collection task.

Optionally, the information returned by the data collection system usually includes a plurality of collected samples. Samples collected by the data collection system may be all used as first hard example samples, or all the samples collected by the data collection system are screened to obtain the first hard example samples.

S303, setting attribute information of the plurality of first hard example samples.

Optionally, in the present disclosure, the attribute information of the first hard example sample mainly includes attribute units such as link information of the first hard example sample, recognition result information of the first hard example sample, and annotation information of the first hard example sample. The link information of the first hard example sample may be information for obtaining the first hard example sample. For example, the link information of the first hard example sample may be a storage address of the first hard example sample. The recognition result information of the first hard example sample may be information for describing an operation processing result obtained after the machine model performs operation processing on the first hard example sample. The annotation information of the first hard example sample may be information for describing an operation processing result that should have been obtained after the machine model performs operation processing on the first hard example sample.

Because the attribute information of the first hard example sample includes the link information of the first hard example sample, the first hard example sample and the attribute information of the first hard example sample may be stored separately. For example, the first hard example samples are all stored in a data storage system, and the attribute information of the first hard example samples is all stored in a badcase management system. In the present disclosure, that the first hard example samples and the attribute information of the first hard example samples are separately stored as two parts, facilitates the management of the first hard example samples, for example, by avoiding impact on the first hard example samples that is caused by a mis-maintenance operation on the attribute information of the first hard example samples.

Optionally, the attribute information of the first hard example sample may further include attribute units such as an identifier (ID) of the first hard example sample, trigger information (such as information about a machine model that reports the first hard example sample) of the first hard example sample, priority information (such as priority of the first hard example sample used in a learning process of a machine model) of the first hard example sample, feature category information of the first hard example sample, machine model version information of machine model learning in which the first hard example sample participates, submitter information (such as a data collection system identifier or a reporter identifier) of the first hard example sample, information about an occurrence frequency of the first hard example sample in a learning process of a machine model, and collection device information (such as a type and model of a camera apparatus) of the first hard example sample.

Optionally, some contents (such as the machine model version information of machine model learning in which the first hard example sample participates and the information about an occurrence frequency of the first hard example sample in a learning process of a machine model) of the attribute information of the first hard example sample may be empty, and gradually complete as the first hard example sample is used. In addition, attribute units included in the attribute information of the first hard example sample may be flexibly set. For example, a plurality of pre-determined attribute units may be preset, and an attribute unit selection function is provided. The attribute unit selection function may display all the pre-determined attribute units in categories. Corresponding pre-determined attribute units may be used as attribute units in the attribute information of the first hard example sample according to received activation information for the pre-determined attribute units. This helps to flexibly organize the attribute units included in the attribute information of the first hard example sample.

Optionally, the annotation information of the first hard example sample may be set by using a data annotation system. In an example, the plurality of first hard example samples returned by the data collection system may be respectively provided to the data annotation system, and the data annotation system annotates each first hard example sample. When annotation information of each first hard example sample returned by the data annotation system is received, annotation information of the plurality of first hard example samples may be respectively set in attribute information of the plurality of first hard example samples.

In a more specific example, the plurality of first hard example samples returned by the data collection system may be first stored in the data storage system, to obtain link information of each first hard example sample, and an annotation task may be generated according to the link information of each first hard example sample, and submitted to the data annotation system. One annotation task usually has a unique annotation task identifier. The data annotation system may obtain each first hard example sample according to the link information of each first hard example sample in the annotation task, set annotation information for the first hard example sample, and generate returned information according to the link information of each first hard example sample, the annotation information, and the annotation task identifier. Annotation information of the plurality of first hard example samples may be respectively set in a corresponding annotation information attribute unit of attribute information of the plurality of first hard example samples according to the returned information of the data annotation system.

Optionally, attribute information of all first hard example samples corresponding to one annotation task may be stored in one file, for example, may be stored in one file in a CSV format. The CSV file may be associated with a corresponding annotation task identifier, and the annotation task identifier in turn may be further associated with a corresponding hard example collection task identifier.

In an example, annotation information of a first hard example sample may be a severe fatigue state, a moderate fatigue state, a mild fatigue state, or a non-fatigue state. In another example, annotation information of a first hard example sample may be calling behavior or non-calling behavior. A specific form of the annotation information of the first hard example sample is not limited in the present disclosure.

Optionally, the data annotation system may set other information in the attribute information of the first hard example sample in addition to the annotation information, for example, the priority information of the first hard example sample, the feature category information of the first hard example sample, and the data collection system identifier, and the like.

In the present disclosure, hard example samples reported by the machine model in learning and use processes are obtained, and hard example collection feature information and hard example collection quantity information are obtained, so that the data collection system can collect targeted hard example samples, to help the machine model to perform targeted learning based on first hard example samples, thereby helping to quickly improve performance of the machine model. The first hard example samples returned by the data collection system are provided to the data annotation system, so that a data flow between hard example sample reporting, the data collection system, and the data annotation system can be established, to help to form a closed loop for the data flow of the first hard example samples, thereby helping to efficiently update the machine model.

Figure 4:
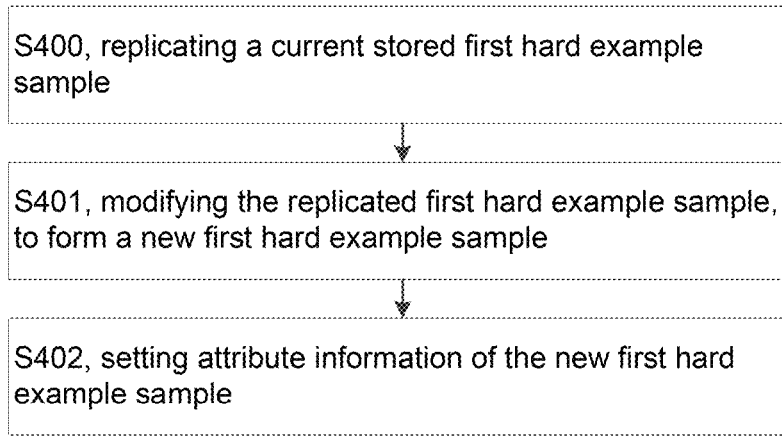
FIG. 4 is a flowchart of an embodiment of obtaining a new first hard example sample according to the present disclosure.

In an optional example, the first hard example samples of the machine model and the attribute information of the first hard example samples may be obtained in another manner in addition to the sample collection manner. For example, a new first hard example sample may be obtained by transforming a currently obtained first hard example sample, as shown in FIG. 4.

S400, replicating a currently stored first hard example sample.

Optionally, in the present disclosure, a sample replication function may be provided, and after the sample replication function is triggered, a selected first hard example sample among the currently stored first hard example samples may be replicated. When the first hard example sample is replicated, attribute information of the first hard example sample may also be replicated.

S401, modifying the replicated first hard example sample to form a new first hard example sample.

Optionally, in the present disclosure, the modifying the replicated first hard example sample may include: masking some image content of the first hard example sample, adjusting an image brightness of the first hard example sample, adjusting an image contrast of the first hard example sample, adjusting an image position of some image content of the first hard example sample, modifying some texts in the first hard example sample, deleting some voice segments in the first hard example sample, and the like. A specific form of modifying the replicated first hard example sample is not limited in the present disclosure.

S402, setting attribute information of the new first hard example sample.

Optionally, in the present disclosure, some contents of the attribute information of the new first hard example sample may be obtained in an inherited manner. For example, priority information of the new first hard example sample, feature category information of the new first hard example sample, annotation information of the new first hard example sample, and the like may inherit the attribute information of the replicated first hard example sample. Attribute information such as a sample identifier and link information may be set for the new first hard example sample. In addition, attribute information of the new first hard example sample may be set by using the data annotation system.

In the present disclosure, a new first hard example sample is obtained in a manner of replication, so that a plurality of different first hard example samples that are substantially the same but differ only in details can be quickly generated based on one first hard example sample, thereby helping to improve efficiency in obtaining the first hard example samples. In addition, functions such as a function of retrieving a first hard example sample, a function of previewing a new first hard example sample, an addition function for adding contents to a first hard example sample, a deletion function for reducing contents of a first hard example sample, an update function for replacing contents in a first hard example sample, and a function of adding a first hard example sample to a corresponding set (such as a training sample set, a testing sample set, or a corresponding hard example group) can be further provided, to facilitate management of the first hard example samples and management on machine model learning.

In an optional example, the second hard example samples of the machine model in current machine learning are determined as shown in FIG. 5.

In FIG. 5, Step S500, grouping the first hard example samples of the machine model according to the category-based data distribution information of the first hard example samples, and obtaining grouping information of a plurality of hard example groups of the machine model.

Optionally, in the present disclosure, all the first hard example samples of the same category may be grouped into one group, which may be referred to as a hard example group. In this way, all the first hard example samples of the machine model may be grouped into a plurality of hard example groups. In an example, all the first hard example samples of the machine model may be grouped into a plurality of hard example groups according to an attribute unit (such as the feature category information) in the attribute information of the first hard example samples. Grouping information of each hard example group may include a group identifier, a category (such as feature category information) of first hard example samples in the group, a quantity of the first hard example samples in the group, and the like.

It should be noted that one first hard example sample usually belongs to only one hard example group, but in the present disclosure, one first hard example sample may belong to a plurality of hard example groups. For example, in a case where the eyes and mouth of a target object in a first hard example sample are both blocked, if grouping information of a first hard example group includes a category of the eyes being blocked, and grouping information of a second hard example group includes a category of the mouth being blocked, the first hard example sample may belong to the first hard example group and the second hard example group. In addition, in the present disclosure, a data analysis function may be provided, and when the data analysis function is triggered, all attribute units in the attribute information of the first hard example samples that are available for grouping may be displayed, or all attribute units included in the attribute information of the first hard example samples may be displayed. After information indicating that an attribute unit is selected is received, all first hard example samples of the same category may be grouped into one group based on the attribute unit.

Step S501, determining a hard example group of the machine model in current learning according to the learning requirement information of the machine model for the categories of the first hard example samples and the grouping information.

Optionally, in the present disclosure, when the learning requirement information of the machine model for the categories of the first hard example samples includes a quantity ratio requirement of machine model learning on first hard example samples of different categories and a total quantity of first hard example samples required for the current learning, a quantity of first hard example samples of the respective category that are required for the current learning may be determined according to the quantity ratio requirement and the total quantity, and each hard example group that is to participate in the current learning of the machine model may be determined according to categories of first hard example samples in a group and a quantity of the first hard example samples in the group in each piece of grouping information. All first hard example samples in each hard example group that is to participate in the current learning of the machine model are used as second hard example samples of the machine model in the current learning. In an example, a grouping function may be provided, and when the grouping function is triggered, the learning requirement information of the machine model for the categories of the first hard example samples may be obtained, and the operation of determining each hard example group that is to participate in the current learning of the machine model may be performed.

In the present disclosure, the first hard example samples of the machine model are grouped, so that first hard example samples of a plurality of categories can participate in a learning process of the machine model as second hard example samples, and a category requirement of the machine model in the current learning on the second hard example samples can be quickly met. For example, the machine model can perform the current learning based on equal quantities of second hard example samples of different categories, to help to improve performance of the machine model that learns successfully.

In an optional example, because a learning process of a machine model usually includes a training process and a testing process, the learning requirement information of the machine model for the categories of the first hard example samples may include training requirement information of the machine model for the categories of the first hard example samples and testing requirement information of the machine model for the categories of the first hard example samples. Therefore, the determining a hard example group of the machine model in the current learning may include: determining a hard example group of the machine model in current training, and determining a hard example group of the machine model in current testing.

Optionally, the hard example group of the machine model in the current training may be determined according to the training requirement information of the machine model for the categories of the first hard example samples and the grouping information of the plurality of hard example groups of the machine model. For example, when the training requirement information of the machine model for the categories of the first hard example samples includes a quantity ratio requirement of machine model training different categories of first hard example samples and a total quantity of first hard example samples required for the current training, a quantity of first hard example samples of a respective category that are required for the current training may be determined according to the quantity ratio requirement and the total quantity, and each hard example group that is to participate in the current training of the machine model may be determined according to categories of first hard example samples in a group and a quantity of the first hard example samples in the group in each piece of grouping information. All first hard example samples in each hard example group that is to participate in the current training of the machine model are used as second hard example samples of the machine model in the current training. All second hard example samples included in each hard example group of the machine model in the current training form a training sample set of the machine model in the current training.

Optionally, the hard example group of the machine model in the current testing may be determined according to the testing requirement information of the machine model for the categories of the first hard example samples and the grouping information of the plurality of hard example groups of the machine model. For example, when the testing requirement information of the machine model for the categories of the first hard example samples includes a quantity ratio requirement of machine model testing different categories of first hard example samples and a total quantity of first hard example samples required for the current testing, firstly, a quantity of first hard example samples of a respective category that are required for the current testing may be determined according to the quantity ratio requirement and the total quantity, and hard example groups that participate in machine model training are removed from all hard example groups. Then, each hard example group that is to participate in the current testing of the machine model may be determined from remaining hard example groups according to categories of first hard example samples in the group and a quantity of the first hard example samples in the group in each piece of grouping information. All first hard example samples in each hard example group that is to participate in the current testing of the machine model are used as second hard example samples of the machine model in the current testing. All second hard example samples included in each hard example group of the machine model in the current testing form a testing sample set of the machine model in the current testing.

Optionally, if the learning process of the machine model further includes a verification process, the learning requirement information of the machine model for the categories of the first hard example samples may further include verification requirement information of the machine model for the categories of the first hard example samples. Therefore, the determining a hard example group of the machine model in the current learning may further include: determining a hard example group of the machine model in current verification. Specifically, the hard example group of the machine model in the current verification may be determined according to the verification requirement information of the machine model for the categories of the first hard example samples and the grouping information of the plurality of hard example groups of the machine model. In an example, when the verification requirement information of the machine model for the categories of the first hard example samples includes a quantity ratio requirement of machine model verifying different categories of first hard example samples, and a total quantity of first hard example samples required for the current verification, firstly, a quantity of first hard example samples of a respective category that are required for the current verification may be determined according to the quantity ratio requirement and the total quantity, and hard example groups that participate in machine model training and testing are removed from all hard example groups. Then, each hard example group that is to participate in the current verification of the machine model may be determined from remaining hard example groups according to categories of first hard example samples in the group and a quantity of the first hard example samples in the group in each piece of grouping information. All first hard example samples in each hard example group that is to participate in the current verification of the machine model are used as second hard example samples of the machine model in the current verification. All second hard example samples included in each hard example group of the machine model in the current verification form a verification sample set of the machine model in the current verification.

Optionally, a training sample set selection function may be provided, that is, when a machine model needs to be trained, the training sample set selection function is activated. When the training sample set selection function is activated, a plurality of training sample sets may be displayed, and when information indicating that a training sample set is selected is received, the machine model may be trained by using the selected training sample set. A testing sample set selection function may be provided, that is, when a machine model needs to be tested, the testing sample set selection function is activated. When the testing sample set selection function is activated, a plurality of testing sample sets may be displayed, and when information indicating that a testing sample set is selected is received, the machine model may be tested by using the selected testing sample set. A verification sample set selection function may be further provided, that is, when a machine model needs to be verified, the verification sample set selection function is activated. When the verification sample set selection function is activated, a plurality of verification sample sets may be displayed, and when information indicating that a verification sample set is selected is received, the machine model may be verified by using the selected verification sample set.

In the present disclosure, hard example groups are respectively set for training and testing the machine model, so that a plurality of categories of first hard example samples can participate in a training process and a testing process of the machine model as second hard example samples, and category requirement of the machine model in a current training process and testing process on the second hard example samples can be quickly met, for example, the machine model can perform current training and testing based on equal quantities of second hard example samples of different categories, thus contributing to improving the performance of the machine model that learns successfully.

In an optional example, the machine model may be trained according to training operation information corresponding to the machine model by using the second hard example samples in each hard example group participating in the current training of the machine model. The training operation information corresponding to the machine model may be a program that enables to perform machine training of the machine model, or the like. The training operation information corresponding to the machine model may be run to perform corresponding operation processing on the second hard example samples by using the machine model, and continuously update the network parameters of the machine model based on operation processing results and attribute information (such as annotation information) of the second hard example samples, so that the network parameters of the machine model are continuously iterated and updated. When the machine model converges as expected, the training process of the machine model is successfully completed.

In an example, it is assumed that all hard example groups of the machine model in current training include a total of m (m is a positive integer, and is usually large, for example, m is larger than 1000) second hard example samples. The training operation information corresponding to the machine model is run to read m1 (m1 is a positive integer, and m1 is less than m) second hard example samples from the m second hard example samples, corresponding operation processing are sequentially performed on the m1 second hard example samples by using the machine model, to obtain m1 operation results. Then loss calculation is performed based on the m1 operation results and annotation information of the m1 second hard example samples by using a preset loss function, and the loss calculation results are back-propagated in the machine model, so as to update the network parameters of the machine model. Then, it is determined whether all the loss calculation results currently obtained converge as expected. If it is expected, the current training of the machine model is successfully completed. If it is not expected, the process of reading m1 second hard example samples from the m second hard example samples and updating the network parameters of the machine model are repeated, until training of the machine model is successfully completed or all of the m second hard example samples have participated in the current training process of the machine model.

In addition, for any one of the m second hard example samples, if a difference between an operation result of operation processing performed by running the training operation information corresponding to the machine model on the second hard example sample by using the machine model and annotation information of the second hard example sample is determined to meet a pre-determined requirement, the second hard example sample as a hard example sample in the training process. Moreover, a training task identifier is formed when the training operation information corresponding to the machine model is run.

In an optional example, the machine model may be tested according to testing operation information corresponding to the machine model by using the second hard example samples in each hard example group participating in current testing of the machine model. The testing operation information corresponding to the machine model in the present disclosure may be a program that enables to perform machine testing of the machine model, or the like. The testing operation information corresponding to the machine model may be run to respectively perform corresponding operation processing on the second hard example samples by using the machine model, and determine performance of the machine model based on operation processing results and attribute information (such as annotation information) of the second hard example samples. In addition, the testing operation information corresponding to the machine model may be further run to update the network parameters of the machine model based on the operation processing results and the attribute information of the second hard example samples, so that the network parameters of the machine model continues to be iterated and updated in the testing process.

In an example, it is assumed that all hard example groups of the machine model in current testing include a total of s (s is a positive integer, and is usually large but less than m, for example, s is larger than 500) second hard example samples. The testing operation information corresponding to the machine model is run to read s1 (s1 is a positive integer, and s1 is less than s) second hard example samples from the s second hard example samples, and corresponding operation processing are sequentially performed on the s1 second hard example samples by using the machine model, to obtain s1 operation results. Then, the performance of the machine model is determined based on the s1 operation results and annotation information of the s1 second hard example samples. In addition, the testing operation information corresponding to the machine model may be further run to perform loss calculation based on the s1 operation results and the annotation information of the s1 second hard example samples by using a preset loss function, and the loss calculation results are back-propagated in the machine model, so as to update the network parameters of the machine model. The process of reading s1 second hard example samples from the s second hard example samples, determining performance of the machine model, and updating the network parameter of the machine model are repeated, until all of the s second hard example samples have participated in the current testing process of the machine model.

In addition, for any one of the s second hard example samples, if a difference between an operation result of operation processing performed by running the training operation information corresponding to the machine model on the second hard example sample by using the machine model and annotation information of the second hard example sample meets a pre-determined requirement, the second hard example sample may be reported as a hard example sample in the testing process. Moreover, a testing task identifier is formed when the testing operation information corresponding to the machine model is run, and the testing task identifier is associated with a corresponding training task identifier and a model identifier of a corresponding machine model that learns successfully.

In the present disclosure, the machine model is trained and tested by using second hard example samples, which helps to orderly and effectively complete the learning process of the machine model, and helps to connect a data flow of hard example samples to a training stage and a testing stage of the machine model respectively, so as to help to efficiently initialize the machine learning lifecycle.

In an optional example, learning process information of the machine model may be obtained in a learning operation process of the machine model. For example, in the training process of the machine model, a second hard example sample that is incorrectly recognized by the machine model is recorded in training process information of the machine model. The training process information may be in a form of a training log. For another example, in the testing process of the machine model, a second hard example sample that is incorrectly recognized by the machine model is recorded in testing process information of the machine model. The testing process information may be in a form of a testing log.

In addition, for the second hard example sample that is incorrectly recognized by the machine model, recognition result information of the machine model may be recorded in attribute information of the second hard example sample. For example, the recognition result information of a second hard example sample in corresponding attribute information of the second hard example sample may be set in accordance with recognition result of the machine model. The recognition result information of the machine model is used to complete the attribute information of the second hard example sample, which helps to closely connect a data flow and a learning stage, to help to form a closed loop in the learning process of the machine model, so as to efficiently implement initialization of the machine learning lifecycle, and help to reduce the cost of the machine learning lifecycle.

The learning process information of the machine model may be obtained according to an actual requirement. For example, the learning process information may include, but is not limited to, a total quantity of second hard example samples used in the learning process (such as a total quantity of second hard example samples used in the training process and a total quantity of second hard example samples used in the testing process), a group identifier of a hard example group to which a second hard example sample used in the learning process belongs (such as a group identifier of a hard example group to which a second hard example sample used in the training process belongs and a group identifier of a hard example group to which a second hard example sample used in the testing process belongs), a total quantity of second hard example samples reported in the learning process (such as a total quantity of second hard example samples reported in the training process and a total quantity of second hard example samples reported in the testing process), an identifier of a second hard example sample reported in the learning process (such as an identifier of a second hard example sample reported in the training process and an identifier of a second hard example sample reported in the testing process), and a learning result of the machine model (such as a training result of the machine model and a testing result of the machine model). The learning process information may be associated with a training task identifier and a testing task identifier. For example, the training process information in the learning process information corresponds to a respective training task identifier, and the testing process information in the learning process information corresponds to a respective testing task identifier.

Optionally, in updating of the machine model based on the learning result of the machine model, the machine model (such as a machine model used by a user device such as a vehicle, a mobile phone, or a computer) may be updated by setting a release task of the machine model. The release task may be associated with hard examples of the machine model in current learning, and the learning process information of the machine model. For example, each release task has a unique release task identifier, and the release task identifier may be associated with a training task identifier and a testing task identifier.

In the present disclosure, the release task, the second hard example samples, and the learning process information of the machine model are associated, which helps to conveniently trace a machine learning lifecycle, thereby helping to manage the machine learning lifecycle.

Exemplary Apparatus

FIG. 6 is a schematic structural diagram of an embodiment of a machine model update apparatus according to the present disclosure. The apparatus in this embodiment can be configured to implement a corresponding method embodiment of the present disclosure.

As shown in FIG. 6, the apparatus includes: a first hard example sample obtaining module 600, a data distribution information determining module 601, a second hard example sample determining module 602, a learning module 603, and a machine model update module 604. Optionally, the apparatus may further include a machine model management module 605.

The first hard example sample obtaining module 600 is configured to obtain first hard example samples of a machine model and attribute information of the first hard example samples.

The data distribution information determining module 601 is configured to determine category-based data distribution information of the first hard example samples according to the attribute information of the first hard example samples obtained by the first hard example sample obtaining module 600.

The second hard example sample determining module 602 is configured to determine second hard example samples of the machine model in current machine learning according to learning requirement information of the machine model for categories of the first hard example samples and the data distribution information determined by the data distribution information determining module 601.

The learning module 603 is configured to perform, according to learning operation information corresponding to the machine model, a learning operation on the machine model by using the second hard example samples determined by the second hard example sample determining module 602.

The machine model update module 604 is configured to update the machine model based on a learning result of the machine model obtained by the learning module 603.

Optionally, the first hard example sample obtaining module 600 may include a first submodule 6001, a second submodule 6002, a third submodule 6003, and a fourth submodule 6004. The first submodule 6001 is configured to receive hard example samples that are reported by the machine model in a current learning process and/or in a use process. The second submodule 6002 is configured to determine hard example collection feature information and hard example collection quantity information of the machine model according to the reported hard example samples received by the first submodule 6001. The third submodule 6003 is configured to provide the hard example collection feature information and the hard example collection quantity information that are determined by the second submodule 6002 to a data collection system, and obtain a plurality of first hard example samples according to information returned by the data collection system. The fourth submodule 6004 is configured to set attribute information of the plurality of first hard example samples obtained by the third submodule 6003.

Optionally, the fourth submodule 6004 may provide the plurality of first hard example samples obtained by the third submodule 6003 respectively to a data annotation system; and set annotation information, returned by the data annotation system, of the plurality of first hard example samples respectively in the attribute information of the plurality of first hard example samples obtained by the third submodule 6003.

Optionally, the first hard example sample obtaining module 600 may include a fifth submodule 6005, a sixth submodule 6006, and a seventh submodule 6007. The fifth submodule 6005 is configured to replicate a currently stored first hard example sample. The sixth submodule 6006 is configured to modify the first hard example sample replicated by the fifth submodule 6005, to form a new first hard example sample. The seventh submodule 6007 is configured to set attribute information of the new first hard example sample obtained by the sixth submodule 6006.

Optionally, the second hard example sample determining module 602 may include an eighth submodule 6021 and a ninth submodule 6022. The eighth submodule 6021 is configured to group the first hard example samples of the machine model according to the data distribution information determined by the data distribution information determining module 601, and obtain grouping information of a plurality of hard example groups of the machine model. The ninth submodule 6022 is configured to determine a hard example group of the machine model in current learning according to the learning requirement information of the machine model for the categories of the first hard example samples and the grouping information obtained by the eighth submodule 6021. All of the first hard example samples in the hard example group of the machine model in current learning are used as second hard example samples of the machine model in current learning.

Optionally, the ninth submodule 6022 may include a first unit and a second unit (not shown in FIG. 6). The first unit is configured to determine a hard example group of the machine model in current training according to training requirement information of the machine model for the categories of the first hard example samples and the grouping information obtained by the eighth submodule 6021. The second unit is configured to determine a hard example group of the machine model in current testing according to testing requirement information of the machine model for the categories of the first hard example samples and the grouping information obtained by the eighth submodule 6021.

Optionally, the learning module 603 includes a tenth submodule 6031 and an eleventh submodule 6032. The tenth submodule 6031 is configured to train the machine model according to training operation information corresponding to the machine model by using the second hard example samples in the hard example group, determined by the first unit, of the machine model in current training. The eleventh submodule 6032 is configured to test the machine model according to testing operation information corresponding to the machine model by using the second hard example samples in the hard example group, determined by the second unit, of the machine model in current testing.

Optionally, the machine model update module 604 is further configured to set a release task of the machine model.

The machine model management module 605 is configured to obtain learning process information of the machine model in a learning operation process of the machine model; and associate the release task, the second hard example samples, and the learning process information of the machine model.

In an example, the machine model management module 605 may be further configured to record, in training process information of the machine model in a training process of the machine model, a second hard example sample that is incorrectly recognized by the machine model; record, in testing process information of the machine model in a testing process of the machine model, a second hard example sample that is incorrectly recognized by the machine model; and record, for the second hard example sample that is incorrectly recognized by the machine model, recognition result information of the machine model in attribute information of the second hard example sample.

Exemplary Electronic Device

Figure 7:
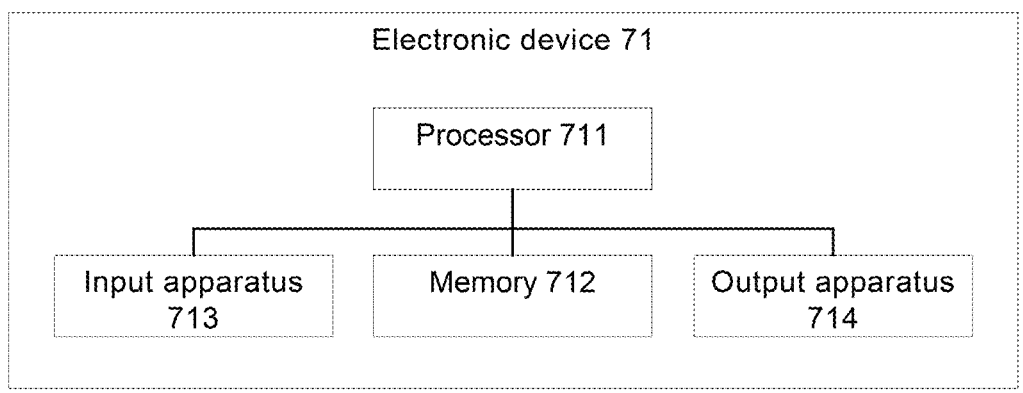
FIG. 7 is a structural diagram of an electronic device according to an exemplary embodiment of the present disclosure.

The electronic device according to the embodiments of the present disclosure is described below with reference to FIG. 7. FIG. 7 is a block diagram of an electronic device according to an embodiment of the present disclosure. As shown in FIG. 7, the electronic device 71 includes one or more processors 711 and a memory 712.

The processor 711 may be a central processing unit (CPU) or other forms of processing units with data processing capability and/or instruction execution capability, and may control other components in the electronic device 71 to perform desired functions.

The memory 712 may include one or more computer program products, and the computer program products may include various forms of computer readable storage media, such as a volatile memory and/or a non-volatile memory. The volatile memory, for example, may include a random access memory (RAM) and/or a cache. The non-volatile memory, for example, may include a read-only memory (ROM), a hard disk, and a flash memory. The computer readable storage medium may store one or more computer program instructions, and the processor 711 may run the program instructions to implement the machine model update method in the embodiments of the present disclosure described above and/or other desired functions. The computer readable storage medium may further store various contents such as input signals, signal components, and noise components.

In an example, the electronic device 71 may further include an input apparatus 713, an output apparatus 714, and the like, and these components are interconnected by a bus system and/or other forms of connection mechanisms (not shown). In addition, the input apparatus 713 may further include, for example, a keyboard and a mouse. The output apparatus 714 may output various information to the outside. The output apparatus 714 may include, for example, a display, a speaker, a printer, a communication network, and a remote output apparatus connected to the communication network.

Certainly, for simplification, FIG. 7 shows only some of the components in the electronic device 71 that are related to the present disclosure, and components such as a bus and an input/output interface are omitted. In addition, according to specific application conditions, the electronic device 71 may further include any other appropriate components.

Exemplary Computer Program Product and Computer Readable Storage Medium

In addition to the above methods and devices, the embodiments of the present disclosure may be a computer program product including computer program instructions which, when run by a processor, cause the processor to perform steps in the machine model update method according to the embodiments of the present disclosure described in the part "exemplary method" of this specification.

The computer program product may use one programming language or any combination of more programming languages to write program codes for performing operations in the embodiments of the present disclosure. The programming languages include object-oriented programming languages, such as Java and C++, and also include conventional procedural programming languages, such as a "C" language or similar programming languages. The program codes can be entirely executed on a user device, partly executed on a user device, executed as an independent software package, partly executed on a user device and partly executed on a remote computing device, or entirely executed on a remote computing device or server.

In addition, the embodiments of the present disclosure may be a computer readable storage medium, storing computer program instructions which, when executed by a processor, cause the processor to perform steps in the machine model update method according to the embodiments of the present disclosure described in the part "exemplary method" of this specification.

The computer readable storage medium may adopt one readable medium or any combination of more readable media. The readable medium may be a readable signal medium or a readable storage medium. The readable storage medium may include, for example but is not limited to, electronic, magnetic, optical, electromagnetic, infrared, or semiconductor systems, apparatuses, or devices, or any combination thereof. More specific examples (non-exhaustive) of the readable storage medium may include, but are not limited to, an electrical connection having one or more wires, a portable disk, a hard disk, a RAM, a ROM, an erasable programmable read-only memory (EPROM or flash memory), an optical fiber, a portable compact disk read-only memory (CD-ROM), an optical storage device, a magnetic storage device, or any suitable combination thereof.

The above describes the basic principle of the present disclosure with reference to specific embodiments. However, it should be noted that the advantages, effects, and the like mentioned in the present disclosure are merely examples rather than limitations, and these advantages, effects, and the like cannot be considered as mandatory for the embodiments of the present disclosure. In addition, the specific details disclosed above are only for the purposes of illustration and easy of understanding, rather than limitations, which do not limit the present disclosure to being implemented using the specific details.

The embodiments in this specification are all described in a progressive manner, each embodiment focuses on a difference from other embodiments, and for same or similar parts in the embodiments, reference may be mutually made to these embodiments. The system embodiment basically corresponds to the foregoing method embodiment, and thus is described relatively briefly. For related parts, reference may be made to the description part of the method embodiment.

The block diagrams of the components, apparatuses, devices, and systems involved in the present disclosure are merely illustrative examples and are not intended to require or imply that they must be connected, arranged, or configured in the manner shown in the block diagrams. As persons skilled in the art may be aware that these components, apparatuses, devices, and systems can be connected, arranged, or configured in any manner. Words such as "including", "comprising" and "having" are open term that means "including but not limited to", which can be used interchangeably. The terms "or" and "and" used herein refer to the term "and/or", which can be used interchangeably, unless otherwise clearly indicated in the context. The term "such as" used herein refers to the phrase "such as but not limited to", which can be used interchangeably.

The method and apparatus of the present disclosure may be implemented in many ways. For example, the method and apparatus of the present disclosure can be implemented by software, hardware, firmware, or any combination thereof. The above-mentioned order of the steps for the method is only for illustration, and the steps of the method of the present disclosure are not limited to the order specifically described above, unless otherwise specifically stated. In addition, in some embodiments, the present disclosure can also be implemented as programs recorded in a recording medium, and these programs include machine readable instructions for implementing the method according to the present disclosure. Thus, the present disclosure also covers the recording medium storing the programs for executing the method according to the present disclosure.

It should also be noted that in the apparatus, device and method of the present disclosure, the components or the steps can be decomposed and/or recombined. The decomposition and/or recombination should be regarded as equivalent solutions of the present disclosure.

The above descriptions of the disclosed aspects are provided to enable any person skilled in the art to make or use the present disclosure. Various modifications to these aspects are very obvious to persons skilled in the art, and the general principles defined herein can be applied to other aspects without departing from the scope of the present disclosure. Therefore, the present disclosure is not intended to be limited to the aspects shown herein, but in accordance with the widest scope consistent with the principles and novel features disclosed herein.

The above descriptions have been given for the purposes of illustration and description. In addition, the descriptions are not intended to limit the embodiments of the present disclosure to the forms disclosed herein. Although a number of exemplary aspects and embodiments have been discussed above, persons skilled in the art may conceive of some variations, modifications, changes, additions, and sub-combinations thereof.

The invention claimed is:

1. A machine model update method, including:
obtaining first hard example samples of a machine model and attribute information of the first hard example samples, wherein the attribute information includes category-related information;
determining category-based data distribution information of the first hard example samples according to the attribute information of the first hard example samples;
determining second hard example samples of the machine model in current machine learning according to learning requirement information of the machine model for categories of the first hard example samples and the data distribution information, wherein the learning requirement information of the machine model for the categories of the first hard example samples includes a quantity ratio requirement of the machine model learning on the first hard example samples of different categories, and a total quantity of the first hard example samples required for the current learning;
performing, according to learning operation information corresponding to the machine model, a learning operation on the machine model by using the second hard example samples; and
updating the machine model based on a learning result of the machine model.

2. The method according to claim 1, wherein the obtaining first hard example samples of a machine model and attribute information of the first hard example samples includes:
receiving hard example samples that are reported by the machine model in a current learning process and/or in a use process;
determining hard example collection feature information and hard example collection quantity information of the machine model according to the reported hard example samples;
providing the hard example collection feature information and the hard example collection quantity information to a data collection system, and obtaining a plurality of first hard example samples according to information returned by the data collection system; and
setting attribute information of the plurality of first hard example samples.

3. The method according to claim 2, wherein the setting attribute information of the plurality of first hard example samples includes:
providing the plurality of first hard example samples to a data annotation system, respectively; and
setting annotation information, returned by the data annotation system, of the plurality of first hard example samples in the attribute information of the plurality of first hard example samples, respectively.

4. The method according to claim 1, wherein the obtaining first hard example samples of a machine model and attribute information of the first hard example samples includes:
replicating a currently stored first hard example sample;
modifying the replicated first hard example sample to form a new first hard example sample; and
setting attribute information of the new first hard example sample.

5. The method according to claim 1, wherein the determining second hard example samples of the machine model in current machine learning according to learning requirement information of the machine model for categories of the first hard example samples and the data distribution information includes:
grouping the first hard example samples of the machine model according to the data distribution information, and obtaining grouping information of a plurality of hard example groups of the machine model; and
determining a hard example group of the machine model in current learning according to the learning requirement information of the machine model for the categories of the first hard example samples and the grouping information,
wherein all first hard example samples in the hard example group of the machine model in the current learning are used as second hard example samples of the machine model in the current learning.

6. The method according to claim 5, wherein the determining a hard example group of the machine model in current learning according to the learning requirement information of the machine model for the categories of the first hard example samples and the grouping information includes:
determining a hard example group of the machine model in current training according to training requirement information of the machine model for the categories of the first hard example samples and the grouping information; and
determining a hard example group of the machine model in current testing according to testing requirement information of the machine model for the categories of the first hard example samples and the grouping information.

7. The method according to claim 1, further including:
obtaining learning process information of the machine model in a learning operation process of the machine model;
setting a release task of the machine model; and
associating the release task, the second hard example samples, and the learning process information of the machine model.

8. A non-transitory computer readable storage medium, wherein the storage medium stores a computer program configured to perform a machine model update method including:
obtaining first hard example samples of a machine model and attribute information of the first hard example samples, wherein the attribute information includes category-related information;
determining category-based data distribution information of the first hard example samples according to the attribute information of the first hard example samples;
determining second hard example samples of the machine model in current machine learning according to learning requirement information of the machine model for categories of the first hard example samples and the data distribution information, wherein the learning requirement information of the machine model for the categories of the first hard example samples includes a quantity ratio requirement of the machine model learning on the first hard example samples of different categories, and a total quantity of the first hard example samples required for the current learning;

performing, according to learning operation information corresponding to the machine model, a learning operation on the machine model by using the second hard example samples; and updating the machine model based on a learning result of the machine model.

9. The non-transitory computer readable storage medium according to claim 8, wherein the obtaining first hard example samples of a machine model and attribute information of the first hard example samples includes:

receiving hard example samples that are reported by the machine model in a current learning process and/or in a use process;

determining hard example collection feature information and hard example collection quantity information of the machine model according to the reported hard example samples;

providing the hard example collection feature information and the hard example collection quantity information to a data collection system, and obtaining a plurality of first hard example samples according to information returned by the data collection system; and setting attribute information of the plurality of first hard example samples.

10. The non-transitory computer readable storage medium according to claim 9, wherein the setting attribute information of the plurality of first hard example samples includes:

providing the plurality of first hard example samples to a data annotation system, respectively; and setting annotation information, returned by the data annotation system, of the plurality of first hard example samples in the attribute information of the plurality of first hard example samples, respectively.

11. The non-transitory computer readable storage medium according to claim 8, wherein the obtaining first hard example samples of a machine model and attribute information of the first hard example samples includes:

replicating a currently stored first hard example sample;

modifying the replicated first hard example sample to form a new first hard example sample; and setting attribute information of the new first hard example sample.

12. The non-transitory computer readable storage medium according to claim 8, wherein the determining second hard example samples of the machine model in current machine learning according to learning requirement information of the machine model for categories of the first hard example samples and the data distribution information includes:

grouping the first hard example samples of the machine model according to the data distribution information, and obtaining grouping information of a plurality of hard example groups of the machine model; and determining a hard example group of the machine model in current learning according to the learning requirement information of the machine model for the categories of the first hard example samples and the grouping information, wherein all first hard example samples in the hard example group of the machine model in the current learning are used as second hard example samples of the machine model in the current learning.

13. The non-transitory computer readable storage medium according to claim 12, wherein the determining a hard example group of the machine model in current learning according to the learning requirement information of the machine model for the categories of the first hard example samples and the grouping information includes:

determining a hard example group of the machine model in current training according to training requirement information of the machine model for the categories of the first hard example samples and the grouping information; and determining a hard example group of the machine model in current testing according to testing requirement information of the machine model for the categories of the first hard example samples and the grouping information.

14. The non-transitory computer readable storage medium according to claim 8, wherein the method further includes:

obtaining learning process information of the machine model in a learning operation process of the machine model;

setting a release task of the machine model; and associating the release task, the second hard example samples, and the learning process information of the machine model.

15. An electronic device, including:

a processor; and a memory, configured to store processor executable instructions, wherein the processor is configured to read the executable instructions from the memory, and execute the instructions to implement a machine model update method including:

obtaining first hard example samples of a machine model and attribute information of the first hard example samples, wherein the attribute information includes category-related information;

determining category-based data distribution information of the first hard example samples according to the attribute information of the first hard example samples;

determining second hard example samples of the machine model in current machine learning according to learning requirement information of the machine model for categories of the first hard example samples and the data distribution information, wherein the learning requirement information of the machine model for the categories of the first hard example samples includes a quantity ratio requirement of the machine model learning on the first hard example samples of different categories, and a total quantity of the first hard example samples required for the current learning;

performing, according to learning operation information corresponding to the machine model, a learning operation on the machine model by using the second hard example samples; and updating the machine model based on a learning result of the machine model.

16. The electronic device according to claim 15, wherein the obtaining first hard example samples of a machine model and attribute information of the first hard example samples includes:

receiving hard example samples that are reported by the machine model in a current learning process and/or in a use process;

determining hard example collection feature information and hard example collection quantity information of the machine model according to the reported hard example samples;

providing the hard example collection feature information and the hard example collection quantity information to a data collection system, and obtaining a plurality of first hard example samples according to information returned by the data collection system; and setting attribute information of the plurality of first hard example samples.

17. The electronic device according to claim 16, wherein the setting attribute information of the plurality of first hard example samples includes:
   providing the plurality of first hard example samples to a data annotation system, respectively; and
   setting annotation information, returned by the data annotation system, of the plurality of first hard example samples in the attribute information of the plurality of first hard example samples, respectively.

18. The electronic device according to claim 15, wherein the obtaining first hard example samples of a machine model and attribute information of the first hard example samples includes:
   replicating a currently stored first hard example sample;
   modifying the replicated first hard example sample to form a new first hard example sample; and
   setting attribute information of the new first hard example sample;
   or
   the method further includes:
   obtaining learning process information of the machine model in a learning operation process of the machine model;
   setting a release task of the machine model; and
   associating the release task, the second hard example samples, and the learning process information of the machine model.

19. The electronic device according to claim 15, wherein the determining second hard example samples of the machine model in current machine learning according to learning requirement information of the machine model for categories of the first hard example samples and the data distribution information includes:
   grouping the first hard example samples of the machine model according to the data distribution information, and obtaining grouping information of a plurality of hard example groups of the machine model; and
   determining a hard example group of the machine model in current learning according to the learning requirement information of the machine model for the categories of the first hard example samples and the grouping information,
   wherein all first hard example samples in the hard example group of the machine model in the current learning are used as second hard example samples of the machine model in the current learning.

20. The electronic device according to claim 19, wherein the determining a hard example group of the machine model in current learning according to the learning requirement information of the machine model for the categories of the first hard example samples and the grouping information includes:
   determining a hard example group of the machine model in current training according to training requirement information of the machine model for the categories of the first hard example samples and the grouping information; and
   determining a hard example group of the machine model in current testing according to testing requirement information of the machine model for the categories of the first hard example samples and the grouping information.

* * * * *